United States Patent [19]

Kalfayan et al.

[11] Patent Number: 4,479,543
[45] Date of Patent: Oct. 30, 1984

[54] METHOD FOR DEEPER PENETRATING ACIDIZING OF SILICEOUS FORMATIONS

[75] Inventors: Leonard J. Kalfayan, Claremont; David R. Watkins, Irvine, both of Calif.

[73] Assignee: Union Oil Company of California, Los Angeles, Calif.

[21] Appl. No.: 518,097

[22] Filed: Jul. 28, 1983

[51] Int. Cl.³ ............................................. E21B 43/27
[52] U.S. Cl. ................................. 166/300; 166/281; 166/307
[58] Field of Search ............... 166/270, 271, 281, 300, 166/307; 252/8.55 C

[56] References Cited

U.S. PATENT DOCUMENTS

| | | |
|---|---|---|
| 2,633,919 | 4/1952 | Bauer et al. . |
| 2,761,512 | 9/1956 | Bond . |
| 2,846,012 | 8/1958 | Lorenz et al. .................... 166/270 |
| 3,036,630 | 5/1962 | Bernard et al. . |
| 3,180,416 | 4/1965 | Smith ................................. 166/281 |
| 3,286,770 | 11/1966 | Knox et al. . |
| 3,310,111 | 3/1967 | Pavlich et al. . |
| 3,343,602 | 9/1967 | Knox et al. ......................... 166/307 |
| 3,845,823 | 11/1974 | Allen . |
| 3,924,684 | 12/1975 | Tate . |
| 4,073,342 | 2/1978 | Harnsberger . |
| 4,073,343 | 2/1978 | Harnsberger . |
| 4,136,739 | 1/1979 | Salathiel et al. . |
| 4,203,492 | 5/1980 | Watanabe . |

FOREIGN PATENT DOCUMENTS 958639  12/1974  Canada ................................. 166/307

*Primary Examiner*—George A. Suchfield
*Attorney, Agent, or Firm*—Dean Sandford; Gregory F. Wirzbicki; Gerald L. Floyd

[57] ABSTRACT

A method for acidizing siliceous subterranean formations wherein the acidizing composition penetrates the formation to a greater extent before spending comprising injecting into the formation first an organosilane or an ester of an organosilane, preferably in a hydrocarbon carrier liquid, and thereafter an aqueous acidizing composition containing (1) a non-oxidizing mineral acid, acid precursor, low molecular weight organic acid or halogenated derivative thereof, and (2) a fluorine-containing acid or salt.

30 Claims, No Drawings

METHOD FOR DEEPER PENETRATING ACIDIZING OF SILICEOUS FORMATIONS

BACKGROUND OF THE INVENTION

1. Field of the Invention

This invention relates to a method for increasing the permeability to fluids of subterranean formations containing siliceous materials, and more particularly concerns a method for acidizing such formations penetrated by a well, especially acidizing the formation in depth away from the well.

2. Description of the Art

Acidizing of wells is a well-known process for increasing or restoring the permeability of subterranean formations so as to facilitate the flow of formation fluids, such as oil, gas or a geothermal fluid, from the formation into the well and also to facilitate the injection of fluids through the well into the formation. Acidizing involves treating the formation with an acid, typically hydrochloric acid, in order to dissolve the formation itself and/or clogging deposits, such as carbonate scale, thereby opening pores and other flow channels and increasing the permeability of the formation. Hydrofluoric acid or a mixture of hydrofluoric and hydrochloric acids, commonly known as "mud acid," is typically employed to dissolve siliceous materials.

Numerous acidizing methods have been proposed to cope with varying well conditions and special formation problems. Uowever, in recent years the increased activity in drilling very deep oil and gas wells and geothermal wells has outpaced the development of suitable acidizing methods, primarily due to the high temperature of these formations.

One problem encountered during acidizing of all formations, especially high temperature formations, is that the acid is rapidly consumed by the reactive material immediately adjacent the borehole before the acid can penetrate any significant distance into the formation. Without adequate formation penetration, the acidizing operation is of limited value. To this end, various additives have been proposed for addition to acidizing compositions to retard the reaction of the acid with the formation or clogging deposits in the formation. Retarders are used in an effort to inject live acid farther out into the formation before the acid reacts completely, thus increasing the permeability of the formation farther from the wellbore.

In other well treatments as disclosed in our copending application Ser. No. 506,537, filed June 21, 1983, it is known to attempt to maintain the permeability of a formation containing loose finely divided particulate matter by injecting therein an organosilane or an ester of an organosilane. It is believed that the injected materials coat the formation fines, polymerize, bind the fines in place and reduce their tendency to shift position, lodge in pore restrictions and reduce formation permeability when fluids are subsequently passed through the formation.

While these and other treatments have met with some success in particular applications, the need exists for a further improved well treating process to increase the permeability of a subterranean siliceous formation, particularly in depth away from a well penetrating the formation.

Accordingly, a principal object of this invention is to provide a method for acidizing a subterranean siliceous formation.

It is a further object to provide such a method for acidizing those siliceous materials contained in portions of the formation which are relatively remote from a borehole.

It is a still further object to provide such a method for acidizing in depth all types of siliceous materials present in the formation.

It is another object to overcome the problems associated with rapid spending of the acidizing solution within a relatively short radial distance from the borehole.

It is yet another object to acidize in depth away from a borehole those formations having a relatively high temperature.

Other objects, advantages and features of this invention will become apparent to those skilled in the art from the following description and appended claims.

SUMMARY OF THE INVENTION

Briefly, the invention provides a method for acidizing siliceous materials contained in subterranean formations penetrated by a well wherein first there is injected into the formation a slug, typically about 0.5 to 100 gallons per vertical foot of formation to be treated, of an organosilane or an ester of an organosilane, preferably in solution in a hydrocarbon carrier liquid, and next there is injected a slug, typically about 0.5 to 20 barrels per vertical foot of formation to be treated, of an aqueous acidizing composition comprising a mixture of (1) a first acidizing component comprising a non-oxidizing mineral acid, acid precursor, low molecular weight organic acid or halogenated derivative thereof, and (2) a second acidizing component comprising a fluorine-containing acid or salt.

By this process the formation pores and channels contacted by the organosilane or ester of an organosilane become at least partially coated with a silane polymer so that the subsequently injected acidizing solution passing through these same pores and channels reacts with these portions of the formation at a sharply reduced rate. Thus, live acid is transported through the silane-treated portions of the formation and is free to react with those portions of the formation located beyond the silane-treated portions, i.e., those portions of the formation which are relatively remote from the borehole.

DETAILED DESCRIPTION OF THE INVENTION

In acidizing a siliceous subterranean formation penetrated by a well by injecting therein via the well a fluorine-containing acidizing solution, it has been the experience that the acidizing solution reacts rapidly with the formation with which it comes in contact and tends to substantially spend itself before the acidizing solution can penetrate a significant distance into the formation. The result is that the siliceous material at the face of the borehole and for a very few inches radially out into the formation are substantially completely dissolved. However, by the time the acidizing solution has penetrated the formation to a depth of more than a few inches, say, for example 6 inches, the acid is largely spent and is incapable of dissolving significant further quantities of siliceous material. Thus, while the borehole is somewhat enlarged, the permeability of the drainage area of the borehole beyond say about 6 inches from the sidewall of the original borehole, is largely unaffected. Also, the acidizing solution tends to attack clays serving as natural cementatious materials holding together particles of the formation, thus weakening the formation in the wellbore area.

It has been discovered that the permeability of a siliceous formation can be increased in an area extending to a substantially greater radial distance away from a borehole if, prior to injection of the acidizing solution, there is injected into the formation a slug of an organosilane or an ester of an organosilane, hereinafter referred to as a "silane material" preferably in solution in a hydrocarbon carrier liquid. The silane material appears to tend to coat the siliceous surfaces and form a polymer thereon. When an acidizing solution is injected into a formation previously treated in this manner, a greater proportion of the acidizing solution flows through the treated formation without reacting with the siliceous material to an appreciable extent. Thus, when the acidizing solution penetrates the formation beyond that portion thereof previously treated with a silane material, live acid is still available to dissolve siliceous materials, thus increasing the permeability of the formation to a substantial radial distance from the wellbore. Also, the reduced attack by the acidizing solution on the clay cementatious materials protects the rock from becoming incompetent at the wellbore as a result of the acidizing treatment.

Among the organosilanes suitable for use in this invention are those having the formula:

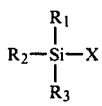

wherein X is a halogen, $R_1$ is an organic radical having from 1 to 50 carbon atoms, and $R_2$ and $R_3$ are the same or different halogens or organic radicals having from 1 to 50 carbon atoms. Preferably, X is a halogen selected from the group consisting of chlorine, bromine and iodine with chlorine being preferred, $R_1$ is an alkyl, alkenyl or aryl group having from 1 to 18 carbon atoms and $R_2$ and $R_3$ are the same or different halogens, or alkyl, alkenyl or aryl group having from 1 to 18 carbon atoms.

Suitable specific organosilanes include methyldiethylchlorosilane, dimethyldichlorosilane, methyltrichlorosilane, dimethyldibromosilane, diethyldiiodosilane, dipropyldichlorosilane, dipropyldibromosilane, butyltrichlorosilane, phenyltribromosilane, diphenyldichlorosilane, tolyltribromosilane, methylphenyldichlorosilane, and the like.

Among the esters of the organosilanes suitable for use in this invention are those having the formula:

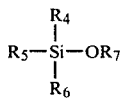

wherein $R_4$, $R_5$ and $R_6$ are independently selected from hydrogen and organic radicals having from 1 to 50 carbon atoms, provided not all of $R_4$, $R_5$ and $R_6$ are hydrogen, and $R_7$ is an organic radical having from 1 to 50 carbon atoms. Preferably, $R_4$, $R_5$ and $R_6$ are independently selected from hydrogen, amine, alkyl, alkenyl, aryl and carbhydryloxy groups having from 1 to 18 carbon atoms, with at least one of the $R_4$, $R_5$ and $R_6$ groups not being hydrogen, and $R_7$ is selected from an amine, alkyl, alkenyl and aryl group having from 1 to 18 carbon atoms. When $R_4$, $R_5$ and/or $R_6$ are carbhydryloxy groups, alkoxy groups are preferred.

Suitable esters of organosilanes include divinyldimethoxysilane, divinyldi-β-methoxyethoxy silane, di(γ-glycidoxy propyl) dimethoxysilane, vinyltriethoxysilane, vinyltris-β-methoxyethoxysilane, γ-glycidoxypropyltrimethoxysilane, γ-methacryloxypropyltrimethoxysilane, β-(3,4-epoxycyclohexyl) ethyltrimethoxysilane, N-β-aminoethyl-γ-propylmethyldimethoxysilane, N-β-aminoethyl-γ-propyltrimethoxysilane, N-β-aminoethyl-γ-aminopropyltrimethoxysilane, γ-aminopropyltriethoxysilane, N-(β-aminoethyl)-γ-aminopropyltrimethoxysilane and the like.

Preferred esters of organosilanes include the amine-containing silanes. The presence of the amine function appears to result in a stronger adsorption of the silane on the formation rock. The resultant polymer renders the treated portion of the formation less oil wet than when a non-amine-containing silane is employed. Thus, in subsequent production of oil through the formation, less oil is retained by the formation and more of the oil is produced. In addition, it appears that polymers formed from amine-containing silanes may be more stable at higher temperatures. Hence, amine-containing silanes may be more useful in higher temperature formations or in formations into which a high temperature fluid is subsequently injected.

The amount of silane material which can be used varies widely depending on such factors as the particular organosilane or organosilane ester employed, the nature, permeability, temperature and other characteristics of the subterranean formation and the like. Generally, the silane material is employed in an amount sufficient to maintain the rate of flow of liquid through the formation at a relatively constant rate following a treatment. Often, this is an amount sufficient to coat a substantial portion of the formation fines. Typically, about 0.5 to 100 gallons per vertical foot of formation to be treated of the silane material is employed.

The silane material can be injected either with or without a hydrocarbon carrier liquid. It is preferred to utilize a hydrocarbon carrier liquid since, with carrier-containing solutions, there is less opportunity for the silane material to contact water and at least partially react during its passage down the well conduit and through the formation in the immediate vicinity of the wellbore. The silane material either alone or mixed with a hydrocarbon carrier liquid passes readily through a permeable formation. However, reacted silane material tends to plate out on the face of the formation and penetrates the formation only to a limited extent. Suitable hydrocarbon carrier liquids include crude oil, an aliphatic hydrocarbon such as hexane, an aromatic hydrocarbon such as benzene, toluene or a petroleum distillation product or fraction such as kerosene, naphthas or diesel fuel. When a hydrocarbon carrier is used, in some instances it may be desired to add up to about 50 percent by volume of a hydrocarbon carrier. Preferably solutions of about 0.2 to 50 percent by volume silane material in hydrocarbon carrier is employed.

While the reaction of the silane material with materials in the formation is not completely understood, and while the invention is not to be held to any theory of operation, it is believed that the silane material condenses on and reacts with active sites on siliceous surfaces with which it comes in contact to form a polymer. It is believed that the silane monomer first hydrolyzes and forms a reactive intermediate and either the acid or alcohol depending on the type of monomer:

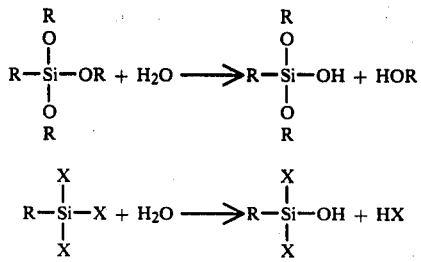

The reactive intermediates, "silanols," then condense to begin formation of the polymer.

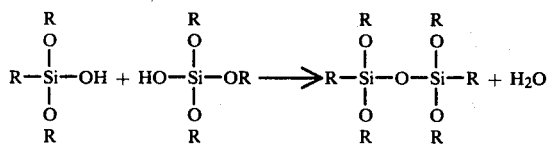

The growth of the polymer can proceed as hydrolysis and condensation continue.

The silanol can also react with active sites on the rock to covalently bind the polymer to it:

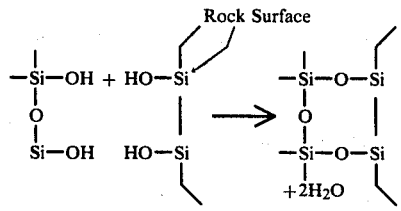

The polymer becomes covalently bonded to any siliceous surface, including clays and the quartz grains which define the pore structure in sandstones or poorly consolidated or unconsolidated formations containing siliceous materials. The polymer acts as a glue to bind formation fines in place, thus reducing their movement when a fluid flows through the formation. The polymer also coats any water-swellable clays and thereby reduces their subsequent swelling by water-containing fluids.

The rate of reaction of the injected silane material with the siliceous materials in the formation depends on various factors such as the organic substituents of the silane material, the concentration of silane material in the injected solution, the particular hydrocarbon carrier, if used, and the formation temperature. While the reaction of the silane material with the siliceous material occurs in the absence of a polymerization catalyst, it is optional to speed up the rate of reaction, either by including a polymerization catalyst in the silane material-containing solution or by injecting a preflush of a slug of hydrocarbon carrier containing a polymerization catalyst prior to the injection of the silane material-containing solution. Suitable catalysts for polymerizing silane material are well known in the art and can be either an acidic or an alkaline material. Examples of acidic catalysts include (1) organic or inorganic acids or acid-forming materials such as acetic acid, ethyl acetate, formic acid, ethyl formate, hydrochloric acid, sulfuric acid and hydroiodic acid, and (2) organic or inorganic bases or base-forming materials such as sodium hydroxide, butylamine, piperidine, phosphines and alkali metal amides. If at least some catalyst is used, no more than about 50 percent by volume of catalyst, based on the volume of the injected solution, should be employed. In this instance the term "injected solution" is defined as a hydrocarbon carrier liquid preflush, a silane or a solution of a silane and a hydrocarbon carrier. Preferably, no more than about 10 percent by volume of catalyst, based on the volume of injected solution, should be employed.

Before injecting the silane material-containing solution, it is optionally preferred to backflow the formation, i.e., inject a slug of a preflush composition. The preflush dislodges any bridges of fines that might have been formed at pore throats during production of fluids from the formation. This increases the probability that subsequently-injected silane material will bind the fines in position at a location in the formation somewhere other than at a pore throat thus increasing the permeability of the formation compared to what it was before the treatment. The materials which can be used as a preflush are the same hydrocarbon carrier liquids described above which are sometimes injected along with the silane material. As mentioned above, the preflush can also contain a catalyst for polymerizing silane material. The volume of preflush to be used is typically about 0.5 to 100 gallons per vertical foot of formation to be treated.

In selecting a preflush material, it is preferred to avoid a mutual solvent, i.e., a material such as a lower alkyl alcohol in which the silane, the hydrocarbon carrier liquid and water each have at least some solubility. When a mutual solvent is injected into a water-containing formation as a preflush, the formation retains at least some of the resulting solution of water in the mutual solvent. If a solution of silane in a hydrocarbon carrier liquid is injected into this formation, some of the solution of water in the material solvent dissolves in the solution of silane in the hydrocarbon carrier. As a result, water can contact the silane and hydrolyze the silane to form a polymer before the silane has adsorbed on the formation rock. This polymer can plug pore channels and thus reduce formation permeability.

Similarly, following injection of the silane material-containing solution, it is optionally preferred to inject a slug of a spacer material. The same hydrocarbon carrier liquids described above or any convenient aqueous or nonaqueous fluid, liquid or gaseous, can be used as the spacer. The volume of liquid spacer to be used is typically about 0.5 to 100 gallons per vertical foot of formation to be treated.

The acidizing solution which is injected following the injection of the silane material can be any of the well known fluorine-containing acidizing solutions comprising a mixture of (1) a first acidizing component comprising a non-oxidizing mineral acid, an acid precursor, or a low molecular weight organic acid or halogenated derivative thereof, and (2) a second acidizing component comprising a fluorine-containing acid or salt. The two acidizing components of the acidizing solution can be mixed at the surface and injected as a single solution, injected simultaneously or injected as separate slugs in any order and allowed to mix in the reservoir. Typically, the acidizing mixture is an aqueous solution containing about 5 to 12 percent by weight of the first acidizing component and about 1 to 10 percent by weight fluoride ion.

The non-oxidizing mineral acid can be hydrochloric acid, nitric acid, hydroiodic acid, hydrobromic acid, sulfuric acid, sulfamic acid or phosphoric acid.

The acid precursor suitable for use in the method of this invention is a normally liquid, halogenated hydrocarbon having one or two carbon atoms per molecule. More specifically, the acid precursor is a normally liquid halogenated hydrocarbon having the generalized formula:

$$C_xH_yX_z$$

wherein
X = 1 or 2;
y = 0, 1 or 2, but $y \leq x$; and
z = 2x − y + 2, and
X is selected from chlorine, bromine and/or iodine, which is thermally stable under the high temperature and pressure conditions to which it is exposed prior to hydrolysis.

Acid precursors are further described in U.S. Pat. No. 4,203,492 issued May 20, 1980 to David J. Watanabe, which patent is herein incorporated by reference. Preferred acid precursors include tetrachloromethane, trichloromethane, pentachloroethane, tetrachloroethane, bromotrichloromethane, chlorodibromomethane, bromodichloromethane, trichlorodibromoethane, dichlorodibromoethane and mixtures thereof. An especially preferred precursor is tetrachloromethane. Acid precursors are especially useful in treating reservoirs having temperatures on the order of 250° F. and higher, especially between about 250° F. and about 700° F.

The low molecular weight organic acids which can be used include those having from 1 to about 6 carbon atoms, such as formic, acetic, citric, propionic and tartaric acids and mixtures thereof. Halogenated organic acids such as mono-, di- and trichloroacetic acids can also be used.

One preferred acid composition is an aqueous solution of hydrochloric acid containing about 5 to 28 percent by weight hydrogen chloride. The acid precursors, organic acids and their halogenated derivatives will generally be used in concentrations ranging from about 10 to 80 percent by weight.

Suitable fluorine-containing acids and salts include hydrofluoric acid, fluoroboric acid, hexafluorophosphoric acid, difluorophosphoric acid and fluorosulfonic acid and the water-soluble alkali metal and/or ammonium salts of these acids. Preferred fluoride salts include ammonium fluoride, ammonium bifluoride, ammonium fluoroborate, ammonium hexafluorophosphate, ammonium difluorophosphate, ammonium fluorosulfonate, cesium fluoride, cesium bifluoride, cesium hexafluorophosphate, cesium difluorophosphate and cesium fluorosulfonate. Particularly preferred are hydrofluoric acid, ammonium fluoride and ammonium bifluoride. Aqueous solutions of hydrofluoric acid or fluoride salt employed will contain about 0.1 to 30 percent by weight fluoride ion, more preferably between about 1 to 10 percent by weight.

Mixtures of hydrochloric acid with hydrofluoric acid are often referred to as "mud acid" because of their ability to dissolve drilling mud particles. These acids normally have a hydrogen chloride content between about 5 and 15 percent by weight and a hydrogen fluoride content between about 2 and 6 percent by weight. They may be prepared by adding crystalline ammonium fluoride or ammonium bifluoride to hydrochloric acid. The hydrogen chloride reacts with the fluoride salt to form hydrogen fluoride and hence the more salt added the greater will be the hydrogen fluoride concentration and the lower will be the hydrogen chloride concentration. Other preparation methods, including the mixing of hydrochloric acid with hydrofluoric acid, can also be employed.

In an especially preferred embodiment the acidizing composition comprises a slug of an aqueous solution of hydrochloric acid, followed by a slug of a mixture of an aqueous solution of hydrochloric acid and hydrofluoric acid, followed by a slug of an aqueous solution of hydrochloric acid.

Other additives commonly employed in acidizing solutions such as corrosion inhibitors, surface active agents, viscosifiers, and demulsifiers can also be employed.

Following injection of the aqueous acidizing solution, it is preferred to inject about 0.5 to 100 gallons per vertical foot of formation to be treated of an afterflush comprising an aqueous solution of a water-soluble salt, such as ammonium chloride, or a liquid which is substantially immiscible with the acidizing solution, for example a hydrocarbon liquid such as crude oil, diesel oil, kerosene and the like. The afterflush displaces the acid out into the formation.

The invention is further illustrated by the following examples which are illustrative of various aspects of the invention and are not intended as limiting the scope of the invention as defined by the appended claims.

EXAMPLES 1 AND 2

There is prepared a series of core plugs 3 inches in length and 15/16 inch in diameter from the Morrow sandstone formation in New Mexico. Examination of these core plugs by a scanning electron microscope shows the presence of a large amount of clay, quartz and non-clay fines. When 100 pore volumes of water are flowed through these cores in the laboratory, the fluid permeability decreases continuously at a sharp rate of decline. This indicates movement and/or swelling of the fines. Freshly cut untreated core A is mounted in a stainless steel sleeve, the annular space between the sidewall of the core and the sleeve is sealed with polymer, and caps tapped with a centrally positioned 174 inch diameter hole are screwed onto each end of the sleeve. The holes are to provide fluid entry into and exit from the core. The core is heated to 180° F.

100 milliliters of a solution of 3 percent by weight methyltriethoxysilane and 2 percent by weight acetic acid catalyst in #2 diesel fuel are injected into the core at a flow rate of 2 milliliters per minutes. Next a back pressure of 100 pounds per square inch (psi) is applied to the core and there is injected into the core 100 milliliters of a 10 percent by weight aqueous solution of hydrochloric acid containing 20 percent by weight methanol and 0.1 percent by weight organic corrosion inhibitor as a preflush, at a rate of 4 milliliters per minute. Next, under the same conditions, there is injected 200 milliliters of an aqueous acidizing solution containing 10 percent by weight hydrochloric acid, 3 percent by weight hydrofluoric acid, 20 percent by weight methanol as a mutual solvent, and 0.1 percent by weight organic corrosion inhibitor. Injection is carried out at a rate of 4 milliliters per minute. A series of samples of effluent from the core is collected 25 minutes, 50 minutes, 75 minutes and 100 minutes after the start of injection of this fluid. Finally, under the same conditions there is injected 100 milliliters of a 10 percent by weight aqueous solution of hydrochloric acid containing 0.1 percent by weight organic corrosion inhibitor as an afterflush.

Similarly, fluids are injected through core B in the same manner as described above with core A, except that in handling core B no solution of methyltriethoxysilane and acetic acid in #2 diesel fuel is employed. Thus, the only fluids injected through core B are the acid preflush, the hydrochloric acid/hydrofluoric acid acidizing solution and the acid afterflush. Samples of the effluent are taken at the same time interval as described above.

The amount of silicon and aluminum, two of the elements present in the formation fines with which the hydrochloric acid/hydrofluoric acid acidizing solution reacts, is determined for each of the effluent samples collected. These results are shown in the following Table.

TABLE

| Sampling Time (minutes) | Silicon Concentration (ppm) | | Aluminum Concentration (ppm) | |
|---|---|---|---|---|
| | Core A | Core B | Core A | Core A |
| 25 | 102 | 609 | 2.6 | 890 |
| 50 | 53 | 605 | 1.6 | 639 |
| 75 | 66 | 538 | 1.2 | 548 |
| 100 | 75 | 538 | 1.1 | 370 |

These results show that the concentration of both silicon and aluminum in the acidizing solution effluent from core A, which is treated with a silane solution before being acidized, is significantly lower than in the acidizing solution effluent from core B, which is not treated with a silane solution before being acidized. Thus, the silane treatment retards the rate of reaction of hydrofluoric acid on clay and silica.

EXAMPLE 3

An Alaskan well is completed in an oil-bearing siliceous formation having a vertical thickness of about 100 feet. Acidizing of similar wells in the area results in only a minor increase in the oil production rate. It is believed that the acidizing solution used in these treatments spends itself in the immediate vicinity of the well and fails to penetrate the formation to a significant depth.

First the formation is given a silane treatment. There is injected into the formation 2,500 gallons of aromatic solvent as a preflush; followed by 2,500 gallons of a solution containing 95 percent by volume aromatic solvent carrier liquid, 3 percent by volume of γ-aminipropyl triethoxysilane and 2 percent by volume of ethyl formate polymerization catalyst; and 2,500 gallons of aromatic solvent as a spacer liquid. Next there is injected into the formation 4,000 gallons of a 10 percent by weight aqueous solution of hydrochloric acid; followed by 8,000 gallons of an aqueous acidizing composition for siliceous materials containing 12 percent by weight hydrochloric acid and 3 percent by weight hydrofluoric acid; followed by an overflush of 4,000 gallons of a 10 percent by weight aqueous solution of hydrochloric acid. All fluids are injected at a rate below the rate necessary to fracture the formation. The well is then returned to production. After the well cleans up the oil production rate increases significantly.

While various specific embodiments and modifications of this invention have been described in the foregoing specification, further modifications will be apparent to those skilled in the art. Such further modifications are included within the scope of this invention as defined by the following claims.

We claim:
1. A method for acidizing siliceous materials contained in a subterranean formation penetrated by a well comprising injecting into the said formation:
   (a) first a slug of an organosilane or an ester of an organosilane, and
   (b) next a slug of an aqueous acidizing composition comprising a mixture of
      (1) a first acidizing component selected from the group consisting of non-oxidizing mineral acids, acid precursors, low molecular weight organic acids, and halogenated derivatives of low molecular weight organic acids, and
      (2) a second acidizing component selected from the group consisting of fluorine-containing acids and fluorine-containing salts.

2. The method defined in claim 1 wherein the amount of organosilane or ester of an organosilane employed is about 0.5 to 100 gallons per vertical foot of formation to be treated.

3. The method defined in claim 1 wherein the amount of aqueous acidizing composition employed is about 0.5 to 20 barrels per vertical foot of formation to be treated.

4. The method defined in claim 1 wherein there is injected into the formation before the organosilane or ester of an organosilane about 0.5 to 100 gallons per vertical foot of formation to be treated of a preflush of a hydrocarbon liquid.

5. The method defined in claim 4 wherein there is included in the preflush of a hydrocarbon liquid up to about 50 percent by volume of a polymerization catalyst.

6. The method defined in claim 1 wherein there is injected into the formation following the organosilane or ester of an organosilane about 0.5 to 100 gallons per vertical foot of formation to be treated of a spacer of a hydrocarbon liquid.

7. The method defined in claim 1 wherein there is injected into the formation following the aqueous acidizing composition about 0.5 to 100 gallons per vertical foot of formation to be treated of an afterflush comprising an aqueous salt solution or a liquid which is substantially immiscible with the aqueous acidizing composition.

8. The method defined in claim 7 wherein the afterflush is a hydrocarbon liquid.

9. The method defined in claim 1 wherein the organosilane has the formula:

$$R_2-\underset{\underset{R_3}{|}}{\overset{\overset{R_1}{|}}{Si}}-X$$

wherein X is a halogen, $R_1$ is an organic radical having from 1 to 50 carbon atoms, and $R_2$ and $R_3$ are the same or different halogens or organic radicals having from 1 to 50 carbon atoms; and the ester of an organosilane has the formula:

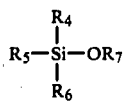

wherein R₄, R₅ and R₆ are independently selected from hydrogen and organic radicals having from 1 to 50 carbon atoms and R₇ is an organic radical having from 1 to 50 carbon atoms.

10. The method defined in claim 1 wherein the organosilane has the formula:

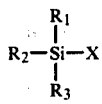

wherein X is a halogen selected from the group consisting of chlorine, bromine and iodine, R₁ is an alkyl, alkenyl or aryl group having from 1 to 18 carbon atoms and R₂ and R₃ are the same or different halogens, or alkyl, alkenyl or aryl group having from 1 to 18 carbon atoms; and the ester of an organosilane has the formula:

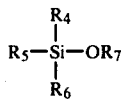

wherein R₄, R₅ and R₆ are independently selected from hydrogen, amine, alkyl, alkenyl, aryl and carbhydroloxy groups having from 1 to 18 carbon atoms, with at least one R₄, R₅ and R₆ groups not being hydrogen, and R₇ is selected from an amine, alkyl, alkenyl and aryl group having from 1 to 18 carbon atoms.

11. The method defined in claim 1 wherein the organosilane or ester of an organosilane is injected as a solution in up to about 50 percent by volume of a hydrocarbon carrier liquid.

12. The method defined in claim 11 wherein the hydrocarbon carrier is selected from the group consisting of crude oil, an aliphatic hydrocarbon, an aromatic hydrocarbon and a petroleum distillation product.

13. The method defined in claim 1 wherein there is included in the organosilane or ester of an organosilane injected up to about 50 percent by volume of a polymerization catalyst.

14. The method defined in claim 1 wherein the ester of an organosilane is an alkylated amine substituted ester of an organosilane.

15. The method defined in claim 1 wherein the ester of an organosilane is y-aminopropyltriethoxysilane.

16. The method defined in claim 1 wherein the said first acidizing component is a non-oxidizing mineral acid selected from the group consisting of hydrochloric acid, nitric acid, hydroiodic acid, hydrobromic acid, sulfuric acid, sulfamic acid and phosphoric acid.

17. The method defined in claim 16 wherein the first acidizing component is hydrochloric acid.

18. The method defined in claim 1 wherein the said first acidizing component is an acid precursor having the generalized formula:

$C_xH_yX_z$ wherein $x = 1$ or $2$;
$y = 0$, $1$ or $2$, but $y \leq x$; and
$z = 2x - y + 2$; and
X is selected from chlorine, bromine and/or iodine.

19. The method defined in claim 18 wherein the acid precursor is selected from the group consisting of tetrachloromethane, trichloromethane, pentachloroethane, tetrachloroethane, bromotrichloromethane, chlorodibromomethane, bromodichloromethane, trichlorodibromomethane, dichlorodibromoethane and mixtures thereof.

20. The method defined in claim 18 wherein the acid precursor is tetrachloromethane.

21. The method defined in claim 1 wherein the first acidizing component is a low molecular weight organic acid selected from the group consisting of formic, acetic, citric, propionic and tartaric acids and mixtures thereof.

22. The method defined in claim 1 wherein the first acidizing component is a low molecular weight halogenated organic acid selected from the group consisting of mono-, di- and trichloroacetic acids.

23. The method defined in claim 1 wherein the second acidizing component is a fluorine-containing acid selected from the group consisting of hydrofluoric, fluoroboric, hexafluorophosphoric, difluorophosphoric and/or fluorosulfonic acids.

24. The method defined in claim 1 wherein the second acidizing component is a fluorine-containing salt selected from the group consisting of ammonium fluoride, ammonium bifluoride, ammonium fluoroborate, ammonium hexafluorophosphate, ammonium difluorophosphate, ammonium fluorosulfonate, cesium fluoride, cesium bifluoride, cesium hexafluorophosphate, cesium difluorophosphate and/or cesium fluorosulfonate.

25. The method defined in claim 1 wherein the second acidizing component is ammonium bifluoride.

26. A method for acidizing siliceous materials contained in a subterranean formation penetrated by a well comprising injecting into the said formation:
(a) first a slug of about 0.5 to 100 gallons per vertical foot of formation to be treated of an ester of an organosilane having the formula:

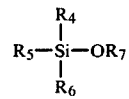

wherein R₄, R₅ and R₆ are independently selected from hydrogen, amine, alkyl, alkenyl, aryl and carbohydroxyl groups having from 1 to 18 carbon atoms, with at least one of the R₄, R₅ and R₆ groups not being hydrogen, and R₇ is selected from an amine, alkyl, alkenyl and aryl group having from 1 to 18 carbon atoms, and
(b) next a slug of about 0.5 to 20 barrels per vertical foot of formation to be treated of an aqueous acidizing composition comprising a mixture containing:
[1] 5 to 12 percent by weight of hydrochloric acid,
[2] 1 to 10 percent by weight of fluoride ion added as a second acidizing component selected from the group consisting of hydroflouric acid, ammonium fluoride and ammonium bifluoride.

27. The method defined in claim 26 wherein the ester of an organosilane is an alkylated amine substituted ester of an organosilane.

28. The method defined in claim 26 wherein the ester of an organosilane is γ-aminopropyltriethoxysilane.

29. The method defined in claim 26 wherein the ester of an organosilane is injected as a solution up to about 50 percent by volume of a hydrocarbon carrier liquid selected from the group consisting of crude oil, an aliphatic hydrocarbon, an aromatic hydrocarbon and a petroleum distillation product.

30. The method defined in claim 26 wherein there is included in the ester of an organosilane injected up to about 50 percent by volume of a polymerization catalyst.

* * * * *